US010248014B2

(12) United States Patent
Masuda

(10) Patent No.: US 10,248,014 B2
(45) Date of Patent: Apr. 2, 2019

(54) WAVELENGTH CONVERSION DEVICE, LIGHT SOURCE DEVICE, AND PROJECTOR

(71) Applicant: SEIKO EPSON CORPORATION, Tokyo (JP)

(72) Inventor: Masaya Masuda, Azumino (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 15/889,716

(22) Filed: Feb. 6, 2018

(65) Prior Publication Data

US 2018/0231880 A1 Aug. 16, 2018

(30) Foreign Application Priority Data

Feb. 13, 2017 (JP) ................... 2017-024105

(51) Int. Cl.
*G03B 21/20* (2006.01)
*H04N 9/31* (2006.01)
*F21V 9/32* (2018.01)
*F21K 9/64* (2016.01)
*G03B 21/16* (2006.01)
*G03B 33/12* (2006.01)
*G03B 21/00* (2006.01)

(52) U.S. Cl.
CPC .............. *G03B 21/204* (2013.01); *F21K 9/64* (2016.08); *F21V 9/32* (2018.02); *G03B 21/16* (2013.01); *G03B 21/208* (2013.01); *G03B 21/2066* (2013.01); *H04N 9/3158* (2013.01); *G03B 21/006* (2013.01); *G03B 33/12* (2013.01)

(58) Field of Classification Search
CPC .............. G03B 21/204; G03B 21/2013; G03B 21/2033; G02B 5/0247; G02B 26/008; F21V 13/08; H04N 9/3158; F21K 9/64
See application file for complete search history.

(56) References Cited

U.S. PATENT DOCUMENTS

2011/0149549 A1 6/2011 Miyake
2014/0285777 A1* 9/2014 Inoue ................... H04N 9/3185
  353/70
2016/0084999 A1 3/2016 Shibata

FOREIGN PATENT DOCUMENTS

JP 2011-129354 A 6/2011
JP 2016-062014 A 4/2016

* cited by examiner

*Primary Examiner* — Ryan D Howard
(74) *Attorney, Agent, or Firm* — Oliff PLC

(57) ABSTRACT

A wavelength conversion device according to the invention includes a wavelength conversion layer having a plurality of pores, and excited by light in a first wavelength band to thereby generate light in a second wavelength band different from the first wavelength band, a transparent member adapted to fill in a recessed section occurring on a surface of the wavelength conversion layer due to the pore, a reflecting member formed on the surface of the wavelength conversion layer and a surface of the transparent member, and a base member disposed on an opposite side to the wavelength conversion layer of the reflecting member.

18 Claims, 5 Drawing Sheets

WAVELENGTH CONVERSION DEVICE, LIGHT SOURCE DEVICE, AND PROJECTOR

BACKGROUND

1. Technical Field

The present invention relates to a wavelength conversion device, a light source device, and a projector.

2. Related Art

In recent years, some of the illumination devices for the projector use fluorescence as the illumination light. For example, in Japanese Patent No. 5,530,165, there is disclosed an illumination device using the fluorescence. In this illumination device, by disposing a metal film (a reflecting member) on a surface of a phosphor made of phosphor ceramics, the fluorescence generated by the phosphor is taken out by reflecting the fluorescence. In this illumination device, it is arranged to reduce pores to be the factor for hindering thermal diffusion.

Incidentally, it is also possible to form the pores inside the phosphor in order to diffuse the fluorescence generated by the phosphor. However, in the case of forming the pores inside the phosphor, recessed sections due to the pores occur on the surface of the phosphor. If the recessed sections occur on the surface of the phosphor, the reflecting member is not formed evenly due to the recessed sections when forming the reflecting member on the surface of the phosphor. Therefore, there is a possibility that the extraction efficiency of the fluorescence from the phosphor decreases due to the decrease in the reflectance of the reflecting member.

SUMMARY

An advantage of some aspects of the invention is to provide a wavelength conversion device capable of achieving high reflectance. Another advantage of some aspects of the invention is to provide a light source device equipped with the wavelength conversion device described above. Still another advantage of some aspects of the invention is to provide a projector equipped with the light source device described above.

According to a first aspect of the invention, a wavelength conversion device is provided. The wavelength conversion device includes a wavelength conversion layer having a plurality of pores, and excited by light in a first wavelength band to thereby generate light in a second wavelength band different from the first wavelength band, a transparent member adapted to fill in a recessed section occurring on a surface of the wavelength conversion layer due to the pore, a reflecting member formed on the surface of the wavelength conversion layer and a surface of the transparent member, and a base member disposed on an opposite side to the wavelength conversion layer of the reflecting member.

According to the wavelength conversion device related to the first aspect of the invention, since the recessed section on the surface of the wavelength conversion layer is filled with the transparent member to form the roughly flat surface, it is possible to evenly form the reflecting member on the surface, and thus, it is possible to prevent the reflectance in reflecting the light generated in the wavelength conversion layer by the reflecting member from degrading. Therefore, it is possible to prevent the extraction efficiency of the light generated in the wavelength conversion layer from degrading.

Further, since the heat generated in the wavelength conversion layer is efficiently transferred to the reflecting member, the heat radiation performance of the wavelength conversion layer is improved. Therefore, in the case of, for example, disposing the heat radiation member on the base member, it is possible to miniaturize the heat radiation member. Therefore, it is possible to achieve the reduction in size of the wavelength conversion device itself.

In the first aspect of the invention described above, it is preferable to further include a rotary device adapted to rotate the base member around a rotational axis.

According to this configuration, by rotating the base member, it becomes possible to temporally change the incident position of the light to the phosphor layer. Therefore, compared to the configuration in which the light concentrically enters the predetermined area of the wavelength conversion layer, it is possible to suppress the influence exerted on the wavelength conversion layer by the heat generated in the wavelength conversion layer by the incident light. Therefore, it is possible to reduce the influence on the wavelength conversion layer such as damages due to the heat.

In the first aspect of the invention described above, it is preferable to further include a heat radiation member disposed on a surface on an opposite side to the wavelength conversion layer in the base member.

According to this configuration, due to the improvement in the heat radiation performance of the wavelength conversion layer, the heat radiation member can be reduced in size, and as a result, it is possible to achieve miniaturization of the wavelength conversion device itself.

According to a second aspect of the invention, a light source device is provided. The light source device includes the wavelength conversion device according to the first aspect of the invention, and a light source adapted to emit the light in the first wavelength band toward the wavelength conversion layer.

According to the wavelength conversion device of the second aspect of the invention, by improving the heat radiation performance of the phosphor layer, the rise in temperature of the phosphor layer can be reduced, and thus, it is possible to reduce the deterioration of the luminous efficiency of the phosphor layer.

According to a third aspect of the invention, a projector is provided. The projector includes the light source device according to the second aspect of the invention, a light modulation device adapted to modulate light from the light source device in accordance with image information to thereby form image light, and a projection optical system adapted to project the image light.

The projector according to the third aspect of the invention is provided with the light source device according to the second aspect of the invention described above, and can therefore form a high-intensity image.

BRIEF DESCRIPTION OF THE DRAWINGS

The invention will now be described with reference to the accompanying drawings, wherein like numbers reference like elements.

DESCRIPTION OF EXEMPLARY EMBODIMENTS

An embodiment of the invention will hereinafter be described in detail with reference to the drawings.

It should be noted that the drawings used in the following description show characteristic parts in an enlarged manner in some cases for the sake of convenience in order to make the characteristics easy to understand, and the dimensional ratios between the constituents and so on are not necessarily the same as actual ones.

First Embodiment

An example of a projector according to the present embodiment will be described. The projector according to the present embodiment is a projection-type image display device for displaying a color picture on a screen SCR. The projector uses three liquid crystal light modulation devices corresponding respectively to colored light beams, namely red light, green light, and blue light as light modulation devices. The projector is provided with a semiconductor laser diode as a light source of an illumination device. It should be noted that although in the present embodiment, there are used transmissive liquid crystal light valves as the light modulation devices, it is also possible to use reflective liquid crystal light valves as the light modulation devices. Further, it is also possible to use the light modulation devices other than the liquid crystal types as in a projector using devices using micromirrors such as digital micromirror devices (DMD) as the light modulation devices. Further, it is also possible to use a light emitting diode (LED) besides the semiconductor diode as the light source of the illumination device.

Figure 1:
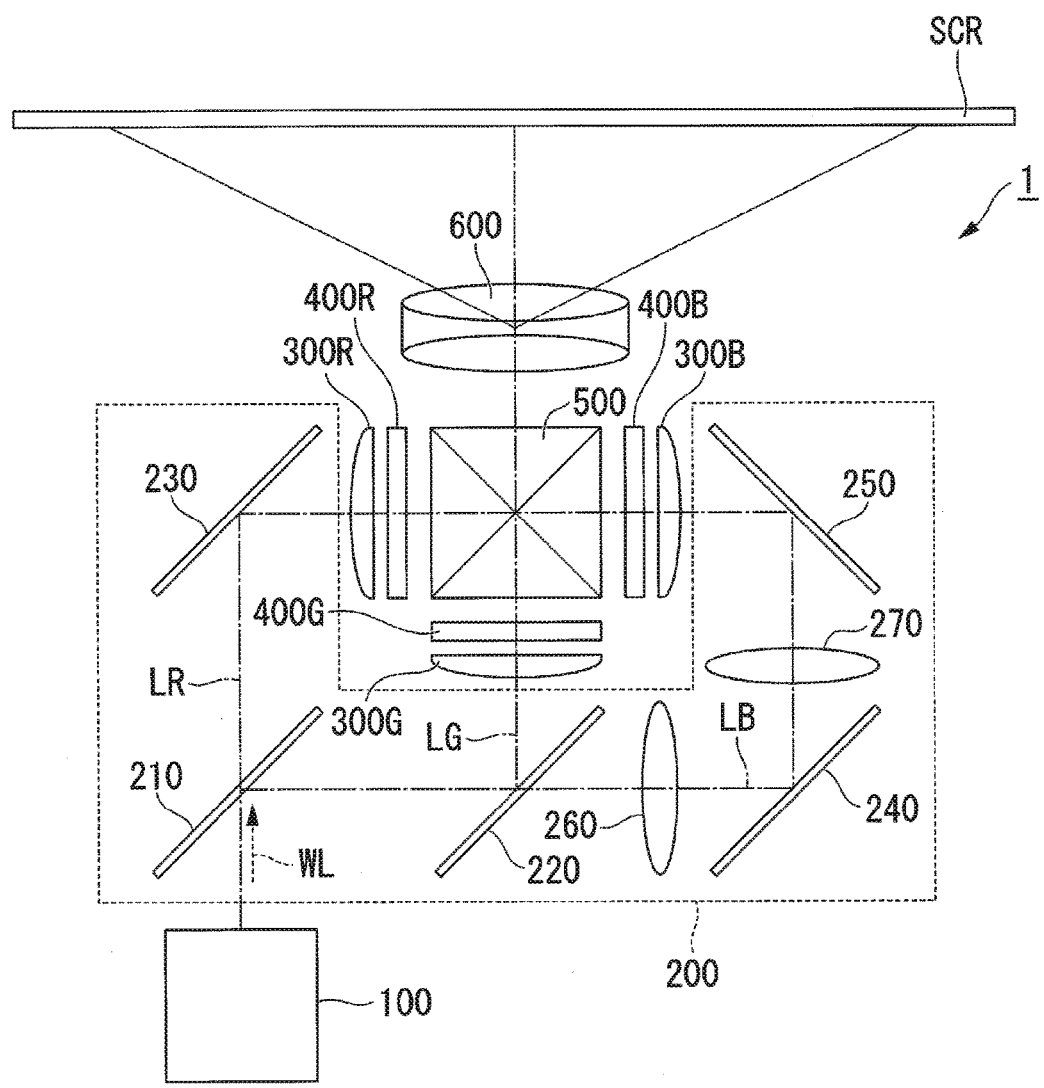
FIG. 1 is a diagram showing an outline of a projector according to a first embodiment of the invention.

FIG. 1 is a schematic diagram showing a configuration of a projector 1 according to the present embodiment.

As shown in FIG. 1, the projector 1 is provided with an illumination device 100, a color separation light guide optical system 200, the liquid crystal light modulation devices 400R, 400G, and 400B, the cross dichroic prism 500, and the projection optical system 600.

In the present embodiment, the illumination device 100 emits white illumination light WL toward a color separation light guide optical system 200.

The color separation light guide optical system 200 is provided with dichroic mirrors 210, 220, reflecting mirrors 230, 240, and 250, and relay lenses 260, 270. The color separation light guide optical system 200 separates the illumination light WL from the illumination device 100 into red light LR, green light LG, and blue light LB, and guides the red light LR, the green light LG, and the blue light LB to the corresponding liquid crystal light modulation devices 400R, 400G, and 400B, respectively.

Between the color separation light guide optical system 200 and the liquid crystal light modulation devices 400R, 400G, and 400B, there are disposed field lenses 300R, 300G, and 300B, respectively.

The dichroic mirror 210 is a dichroic mirror for transmitting the red light component and reflecting the green light component and the blue light component.

The dichroic mirror 220 is a dichroic mirror for reflecting the green light component and transmitting the blue light component.

The reflecting mirror 230 is a reflecting mirror for reflecting the red light component.

The reflecting mirrors 240, 250 are reflecting mirrors for reflecting the blue light component.

The red light LR having passed through the dichroic mirror 210 is reflected by the reflecting mirror 230, then passes through the field lens 300R, and then enters the image forming area of the liquid crystal light modulation device 400R for the red light.

The green light LG having been reflected by the dichroic mirror 210 is further reflected by the dichroic mirror 220, then passes through the field lens 300G, and then enters the image forming area of the liquid crystal light modulation device 400G for the green light.

The blue light LB having been transmitted through the dichroic mirror 220 enters the image forming area of the liquid crystal light modulation device 400B for the blue light via the relay lens 260, the reflecting mirror 240, the relay lens 270, the reflecting mirror 250, and the field lens 300B.

The liquid crystal light modulation devices 400R, 400G, and 400B are for modulating the respective colored light beams having input thereto in accordance with the image information to thereby form a color image corresponding to the colored light beams. It should be noted that, although not shown in the drawings, incident side polarization plates are disposed between the field lenses 300R, 300G, 300B and the liquid crystal light modulation devices 400R, 400G, 400B, respectively, and exit side polarization plates are disposed between the liquid crystal light modulation devices 400R, 400G, 400B and the cross dichroic prism 500, respectively.

The cross dichroic prism 500 is an optical element for combining the image light emitted from the respective liquid crystal light modulation devices 400R, 400G, 400B with each other to form the color image.

The cross dichroic prism 500 has a roughly rectangular planar shape composed of four rectangular prisms bonded to each other, and on the roughly X-shaped interfaces on which the rectangular prisms are bonded to each other, there are formed dielectric multilayer films.

The color image emitted from the cross dichroic prism 500 is projected in an enlarged manner by the projection optical system 600 to form an image on the screen SCR.

Illumination Device

Figure 2:
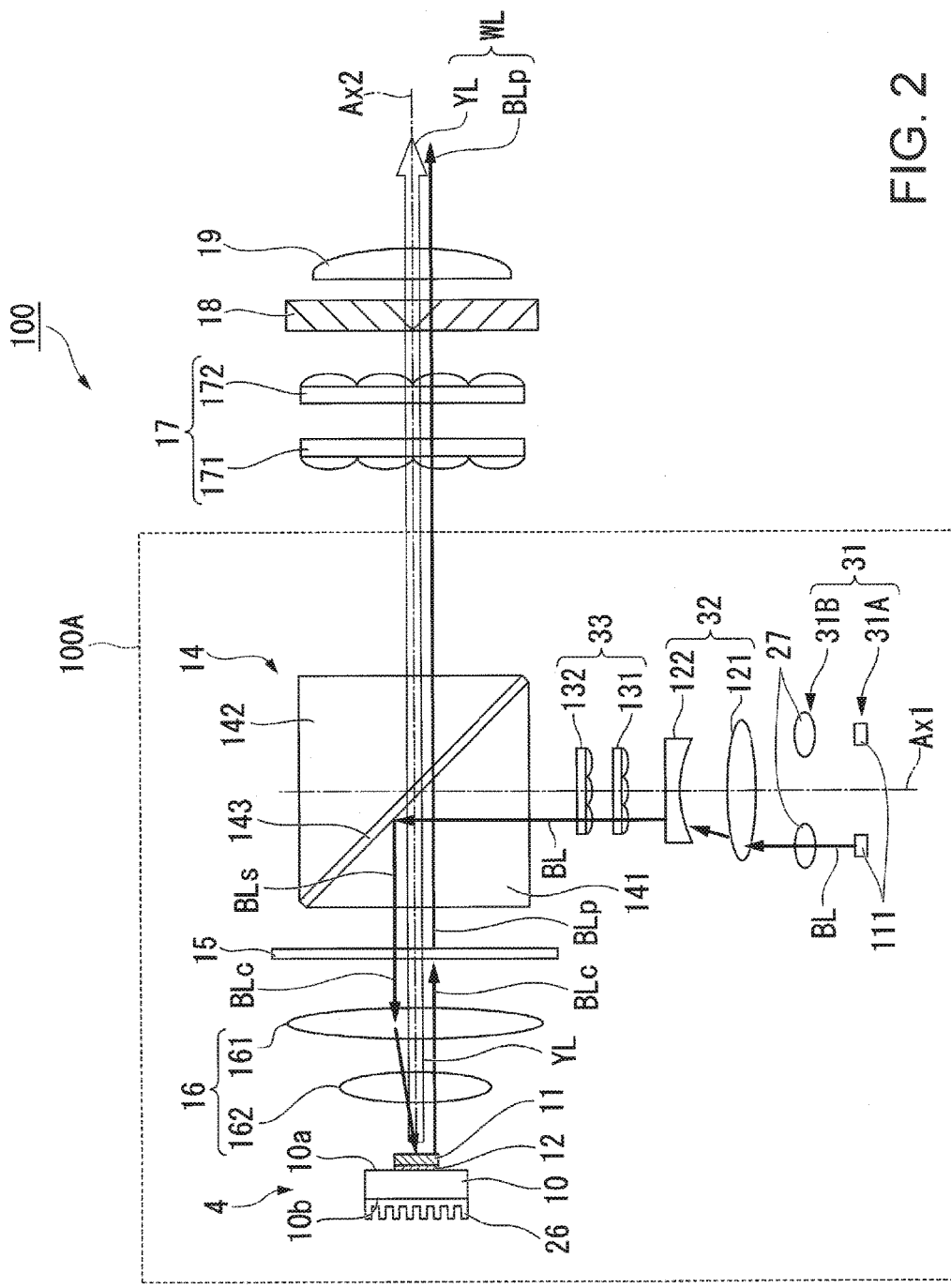
FIG. 2 is a diagram showing an outline of an illumination device according to the first embodiment.

FIG. 2 is a schematic view showing a configuration of the illumination device 100.

The illumination device 100 emits the illumination light WL toward the color separation light guide optical system 200 as described above. As shown in FIG. 2, the illumination device 100 is provided with a light source device 100A, an integrator optical system 17, a polarization conversion element 18, and an overlapping lens 19. The light source device 100A is provided with a light source section 31, an afocal optical system 32, a homogenizer optical system 33, a polarization separation device 14, a wave plate 15, a pickup optical system 16, and a wavelength conversion device 4. Further, the light source section 31 is provided with an array light source 31A and a collimator optical system 31B.

The array light source 31A of the light source section 31 is formed of a plurality of semiconductor lasers 111. The semiconductor laser 111 as a solid-state light source element or a light emitting element corresponds to a "solid-state light source" in the appended claims.

Specifically, the array light source 31A is firmed by arranging the plurality of semiconductor lasers 111 in an array in a single plane perpendicular to an illumination light axis Ax1 of a light beam emitted from the array light source 31A. It should be noted that although described later in detail, defining the illumination light axis of the light beam reflected by the wavelength conversion device 4 as Ax2, the illumination light axis Ax1 and the illumination light axis Ax2 are perpendicular to each other. On the illumination light axis Ax1, the array light source 31A, the collimator optical system 31B, the afocal optical system 32, the homogenizer optical system 33, and the polarization separation device 14 are arranged in this order.

In contrast, on the illumination light axis Ax2, the wavelength conversion device 4, a pickup optical system 16, a wave plate 15, a polarization separation device 14, an integrator optical system 17, a polarization conversion element 18, and an overlapping lens 19 are arranged in this order in the proceeding direction of fluorescence YL described later.

The semiconductor lasers 111 constituting the array light source 31A each emit the excitation light (the blue light BL) having a peak wavelength in the wavelength region of, for example, 440 through 480 nm. Further, the blue light BL emitted from each of the semiconductor lasers 111 is coherent linearly-polarized light, and is emitted toward the polarization separation device 14 in parallel to the illumination light axis Ax1. In the present embodiment, the blue light BL corresponds to "light in a first wavelength band" in the appended claims.

Further, the array light source 31A makes the polarization direction of the blue light BL emitted by each of the semiconductor lasers 111 coincide with the polarization direction of the polarization component (e.g., an S-polarization component) to be reflected by a polarization separation layer 143 of the polarization separation device 14. The blue light BL emitted from the array light source 31A enters the collimator optical system 31B.

The collimator optical system 31B is for converting the blue light BL having been emitted from the array light source 31A into parallel light. The collimator optical system 31B is provided with, for example, a plurality of collimator lenses 27 arranged in an array corresponding respectively to the semiconductor lasers 111. The blue light BL, which has been converted into the parallel light by passing through the collimator optical system 31B, enters the afocal optical system 32.

The afocal optical system 32 adjusts the beam diameter of the blue light BL having entered the afocal optical system 32 from the collimator optical system 31B. The afocal optical system 32 is provided with a lens 121 and a lens 122. The blue light BL, which has been adjusted in size by passing through the afocal optical system 32, enters the homogenizer optical system 33.

The homogenizer optical system 33 homogenizes the illuminance distribution by the blue light BL in the illumination target area in cooperation with the pickup optical system 16 described later. The homogenizer optical system 33 is provided with a pair of multi-lens arrays 131, 132. The blue light BL having been emitted from the homogenizer optical system 33 enters the polarization separation device 14.

The polarization separation device 14 is a so-called prism-type polarization beam splitter (PBS), and transmits one of the P-polarized light and the S-polarized light, and reflects the other thereof. The polarization separation device 14 is provided with prisms 141, 142, and the polarization separation layer 143. These prisms 141, 142 are each formed to have a roughly triangular prism shape, and each have a tilted surface having an angle of 45° with the illumination light axis Ax1 and an angle of 45° with the illumination light axis Ax2.

The polarization separation layer 143 is disposed on the tilted surface described above, and has a polarization separation function of separating the blue light BL in a first wavelength band having entered the polarization separation layer 143 into the S-polarization component and the P-polarization component. The polarization separation layer 143 reflects the S-polarization component of the blue light BL, and transmits the P-polarization component of the blue light BL.

Further, the polarization separation layer 143 has a color separation function of transmitting light in a second wavelength band (the green light LG and the red light LR) different from the first wavelength band (the wavelength band of the blue light BL) out of the light having entered the polarization separation layer 143 irrespective of the polarization state thereof. It should be noted that the polarization separation device 14 is not limited to the prism-type device, but a plate-type polarization separation device can also be used.

In the present embodiment, the blue light BL having entered the polarization separation layer 143 coincides in polarization direction with the S-polarization component, and is therefore reflected toward the wavelength conversion device 4 as S-polarized excitation light (hereinafter referred to as blue light BLs).

The wave plate 15 is a ¼ wave plate disposed in the light path between the polarization separation layer 143 and the wavelength conversion device 4. The blue light BLs as the S-polarized light entering the wave plate 15 is converted into blue light BLc as circularly polarized light, and then enters the pickup optical system 16. It should be noted that the wave plate 15 can also be a ½ wave plate.

The pickup optical system 16 converges the blue light BLc toward the wavelength conversion device 4. The pickup optical system 16 is provided with a lens 161 and a lens 162. Specifically, the pickup optical system 16 converges the plurality of light beams (the blue light BLc), which has entered the pickup optical system 16, toward the wavelength conversion device 4, and at the same time overlaps the light beams with each other on the wavelength conversion device 4.

The blue light BLc from the pickup optical system 16 enters the wavelength conversion device 4. The wavelength conversion device 4 is excited by a part of the blue light BLc to thereby generate the fluorescence YL including the red light and the green light. The fluorescence YL has a peak wavelength in a wavelength region of, for example, 500 through 700 nm. It should be noted that the configuration of the wavelength conversion device 4 will be described later. A part of the blue light BLc is reflected by the wavelength conversion device as described later. In the present embodiment, the fluorescence YL corresponds to "light in a second wavelength band" in the appended claims. It should be noted that a part of the fluorescence YL is also reflected by the wavelength conversion device 4.

Then, the fluorescence YL having been emitted from the wavelength conversion device 4 and the blue light BLc having been reflected by the wavelength conversion device pass through the pickup optical system 16 and the wave plate 15, and then enter the polarization separation device 14. Here, the blue light BLc passes the wave plate 15 once again to turn to the P-polarized blue light BLp. The blue light BLp is transmitted through the polarization separation layer 143. Further, the fluorescence YL is transmitted through the polarization separation layer 143. The fluorescence YL and the blue light BLp (the P-polarized blue light) are combined with each other to generate the white illumination light WL. The illumination light WL enters the integrator optical system 17.

The integrator optical system 17 homogenizes the illuminance distribution in the illumination target area in cooperation with the overlapping lens 19 described later. The integrator optical system 17 is provided with a pair of lens arrays 171, 172. The pair of lens arrays 171, 172 are each formed of a component having a plurality of lenses arranged in an array. The illumination light WL having been emitted from the integrator optical system 17 enters the polarization conversion element 18.

The polarization conversion element 18 is formed of a polarization separation film and a wave plate, and converts the illumination light WL into linearly polarized light. The illumination light WL having been emitted from the polarization conversion element 18 enters the overlapping lens 19.

The overlapping lens 19 overlaps the illumination light WL in the illumination target area to thereby homogenize the illuminance distribution of the illumination target area.

Wavelength Conversion Device

As shown in FIG. 2, the wavelength conversion device 4 is provided with a base member 10 and a phosphor layer 11, and is configured so as not to rotate. The base member 10 has a first surface 10a located on the pickup optical system 16 side, and a second surface 10b located on the opposite side to the first surface 10a. The wavelength conversion device 4 is further provided with a reflecting layer 12 and a heat radiation member 26, wherein the reflecting layer 12 is disposed between the first surface 10a and the phosphor layer 11, and the heat radiation member 26 is disposed on the second surface 10b. In the present embodiment, the phosphor layer 11 corresponds to a "wavelength conversion layer" described in the appended claims, and the reflecting layer 12 corresponds to a "reflecting member" described in the appended claims.

In the present embodiment, as a material of the base member 10, a material high in thermal conductivity and superior in heat radiation property is preferably used, and there can be cited, for example, metal such as aluminum or copper, and ceramics such as aluminum nitride, alumina, sapphire, or diamond.

In the present embodiment, the phosphor layer 11 is held on the first surface 10a of the base member 10 via a fixation member 13. The phosphor layer 11 converts a part of the light having entered the phosphor layer 11 into the fluorescence YL, and then emits the fluorescence YL, and at the same time emits another part thereof without converting the part into the fluorescence YL. Further, the reflecting layer 12 reflects the light, which has entered the reflecting layer 12 from the phosphor layer 11, toward the pickup optical system 16.

The heat radiation member 26 is formed of, for example, a structure constituted by a heatsink, and having a plurality of fins 26a. The heat radiation member 26 is disposed on the second surface 10b on the opposite side to the phosphor layer 11 in the base member 10. It should be noted that the heat radiation member 26 is fixed to the base member 10 with, for example, bonding (metal bonding) using metal brazing.

Figure 3:
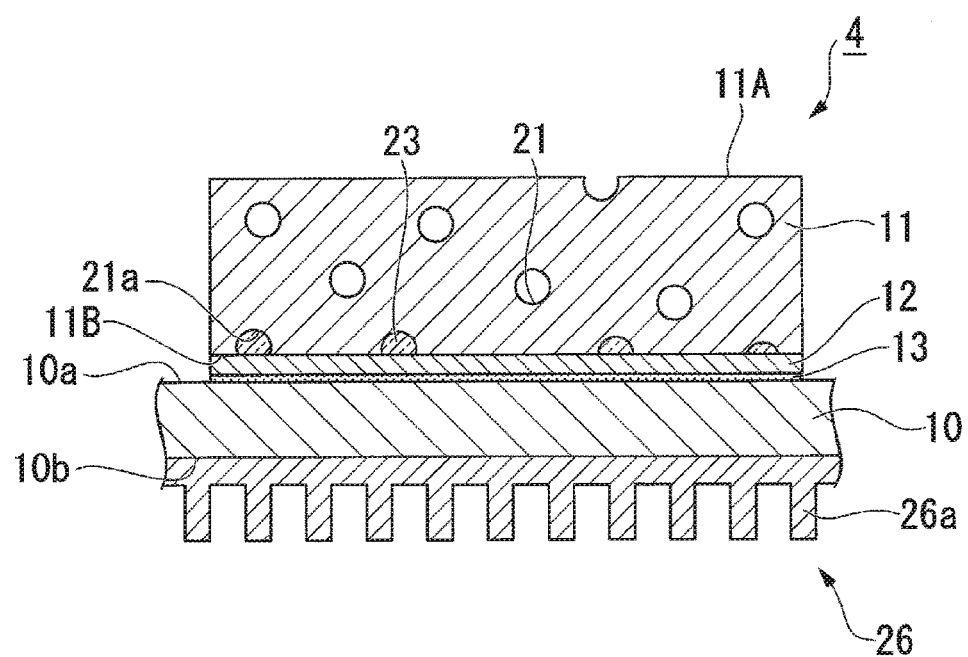
FIG. 3 is a cross-sectional view showing a configuration of an essential part of a wavelength conversion device.

FIG. 3 is a cross-sectional view showing a configuration of an essential part of the wavelength conversion device 4.

As shown in FIG. 3, the phosphor layer 11 is provided with a light emitting surface 11A and a bottom surface 11B, wherein the blue light BLc enters the light emitting surface 11A, the fluorescence YL is emitted from the light emitting surface 11A, and the reflecting layer 12 is disposed on the bottom surface 11B.

In the present embodiment, the phosphor layer 11 is formed by calcining phosphor particles. As the phosphor particles for forming the phosphor layer 11, there is used a YAG (yttrium aluminum garnet) phosphor including Ce ions. It should be noted that the constituent material of the phosphor particles can be unique, or it is also possible to use a mixture of the particles formed using two or more types of materials. As the phosphor layer 11, there is preferably used a phosphor layer having the phosphor particles dispersed in an inorganic binder such as alumina, a phosphor layer formed by calcining a glass binder as an inorganic material and the phosphor particles, or the like.

The phosphor layer 11 has a plurality of pores 21 disposed inside. Thus, the phosphor layer 11 is made to have a light scattering property due to the plurality of pores 21. The plurality of pores 21 is formed of, for example, pores with the average particle diameter of about 60 μm.

Since a part of the plurality of pores 21 is formed on the surface (the bottom surface 11B) of the phosphor layer 11, recessed sections 21a due to the pores occur on the bottom surface 11B of the phosphor layer 11. The wavelength conversion device 4 according to the present embodiment has a transparent member 23 filling the recessed sections 21a.

As the material of the transparent member, there is used an inorganic material having a light transmissive property such as alumina, $Y_3Al_5O_{12}$, $YAlO_3$, zirconium dioxide, $Lu_3Al_5O_{12}$, or $SiO_2$ (glass paste), or an anaerobic adhesive. In the present embodiment, as the material of the transparent member 23, there is used, for example, $SiO_2$.

The reflecting layer 12 is formed by, for example, being deposited on the bottom surface 11B of the phosphor layer 11 using vapor deposition. As a material of the reflecting layer 12, there is used, for example, Al, Ag, or the like. Here, if the flatness of the bottom surface 11B is low, it becomes difficult to deposit the reflecting layer 12 with the vapor deposition in good condition. If the reflecting layer 12 is not deposited to the bottom surface 11B in good condition, it is not possible to reflect the fluorescence YL toward the light emitting surface 11A, and the extraction efficiency of the fluorescence YL decreases.

In contrast, in the wavelength conversion device 4 according to the present embodiment, the recessed sections 21a are filled with the transparent member 23 to thereby make the bottom surface 11B become a roughly flat surface. Here, the roughly flat surface denotes the flatness enough for forming the reflecting layer 12 on the bottom surface 11B with the vapor deposition or the like in good condition, and the unevenness with which the reflecting layer 12 can be deposited is allowed.

In the present embodiment, the transparent member 23 is selectively disposed in each of the recessed sections 21a, and is not disposed on the bottom surface 11B. The reflecting layer 12 is formed on the surface (the bottom surface 11B) of the phosphor layer 11 and the surface of each of the transparent members 23. In other words, the reflecting layer 12 is formed throughout the entire area of the bottom surface 11B of the phosphor layer 11.

Further, the reflecting layer 12 formed on the bottom surface 11B of the phosphor layer 11 is held on the base member 10 via the fixation member 13. As the bonding method with the fixation member 13, it is preferable to use bonding (metal bonding) with metal brazing such as silver solder. Thus, it is possible to improve the thermal conductivity between the reflecting layer 12 and the base member 10.

In the present embodiment, on the light emitting surface 11A of the phosphor layer 11, there is formed an antireflection film (an AR coat film) not shown. It should be noted that the light emitting surface 11A can be provided with the recessed section by a part of the pore 21 exposed similarly to the bottom surface 11B, or can also be provided with no recessed section.

The wavelength conversion device 4 according to the present embodiment is manufactured by, for example, a manufacturing method described below. FIG. 4A through FIG. 4D are diagrams showing a part of a manufacturing process of the wavelength conversion device 4.

Firstly, the mixture of the phosphor particles constituting the phosphor layer 11 and an organic substance is prepared, and then the mixture is calcined at a predetermined temperature.

Figure 4A:
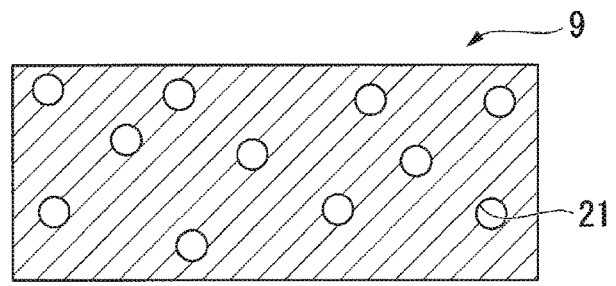
FIG. 4A is a diagram showing apart of a manufacturing process of the wavelength conversion device.

Due to the calcination, the organic substance evaporates, and as shown in FIG. 4A, there is formed the phosphor layer 11 including the plurality of pores 21 and formed of the phosphor. It should be noted that the size or the number of the pores 21 can be controlled by the calcination temperature, the material of the organic substance and so on.

Figure 4B:
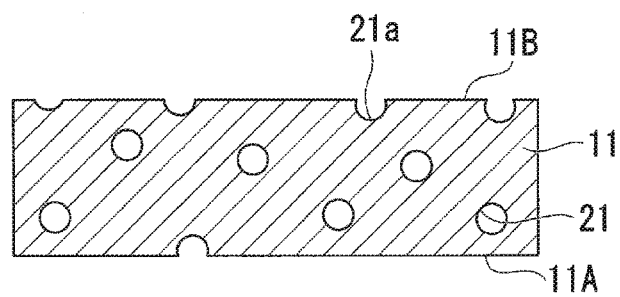
FIG. 4B is a diagram showing a part of the manufacturing process of the wavelength conversion device.

Subsequently, as shown in FIG. 4B, the both surfaces of the phosphor layer 11 is ground to form the phosphor layer 11 having the light emitting surface 11A and the bottom surface 11B. Due to the grinding process, a part of the pore 21 is exposed to the outside, and thus, the recessed sections 21a are formed on the bottom surface 11B of the phosphor layer 11.

Figure 4C:
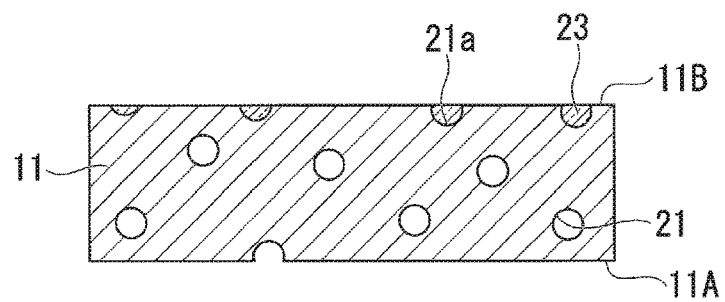
FIG. 4C is a diagram showing a part of the manufacturing process of the wavelength conversion device.

Subsequently, a glass paste is applied on the bottom surface 11B. After removing the excess of the glass paste, the glass paste is calcined to thereby fill the recessed sections 21a with the transparent member 23 as shown in FIG. 4C. By removing the excess of the glass paste as described above, it is possible to selectively disposing the transparent member 23 in each of the recessed sections 21a. By filling the recessed section 21a with the transparent member 23 in such a manner, it is possible to make the bottom surface 11B of the phosphor layer 11 roughly flat surface. It should be noted that the temperature in calcining the glass paste is lower than the temperature in calcining the mixture of the phosphor particles and the organic substance.

Figure 4D:
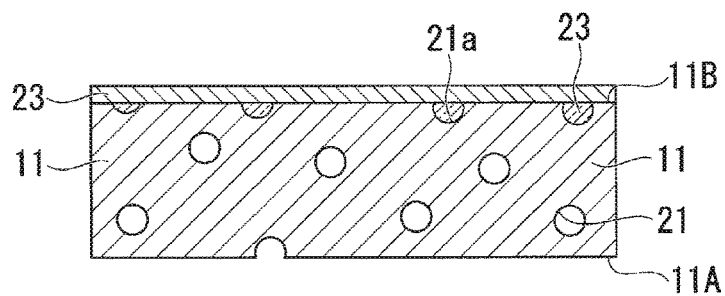
FIG. 4D is a diagram showing a part of the manufacturing process of the wavelength conversion device.

Subsequently, as shown in FIG. 4D, the reflecting layer 12 is formed on the bottom surface 11B, which has been planarized with the transparent member 23, using the vapor deposition or sputtering. The reflecting layer 12 is formed in the state of covering the surface (the bottom surface 11B) of the phosphor layer 11 and the surface of the transparent member 23. It should be noted that since the bottom surface 11B is made as the flat surface as described above, it is possible to deposit the reflecting layer 12 evenly on the bottom surface 11B.

Subsequently, the stacked body of the reflecting layer 12 and the phosphor layer 11, and the base member 10 are fixed to each other via the fixation member 13. Lastly, by fixing the heat radiation member 26 to the surface on the opposite side to the phosphor layer 11 in the base member 10, the wavelength conversion device 4 is manufactured.

As described hereinabove, according to the wavelength conversion device 4 of the present embodiment, the reflecting layer 12 is formed evenly throughout the entire area of the bottom surface 11B of the phosphor layer 11. Therefore, the component having entered the bottom surface 11B out of the fluorescence YL generated by the phosphor layer 11 is reflected by the reflecting layer 12 in good condition, and is then emitted from the light emitting surface 11A. Therefore, it is possible to improve the extraction efficiency of the fluorescence YL.

Further, since the bottom surface 11B becomes the roughly flat surface, it is possible to increase the contact area between the phosphor layer 11 and the reflecting layer 12. Thus, the heat generated in the phosphor layer 11 is efficiently transmitted to the reflecting layer 12. Further, the heat generated in the phosphor layer 11 is transmitted toward the base member 10 and the heat radiation member 26 via the reflecting layer 12. Therefore, the heat radiation performance of the phosphor layer 11 is improved.

By improving the heat radiation performance of the phosphor layer 11, the heat radiation member 26 can be reduced in size, and therefore, it is possible to miniaturize the wavelength conversion device 4.

Further, according to the wavelength conversion device 4 of the present embodiment, by improving the heat radiation performance of the phosphor layer 11, the rise in temperature of the phosphor layer 11 can be reduced, and thus, it is possible to reduce the deterioration of the luminous efficiency of the phosphor layer 11. Therefore, according to the light source device 100A equipped with the wavelength conversion device 4, it is possible to provide the light source device, which reduces the loss of the fluorescence YL with respect to the intensity of the incident excitation light.

Further, according to the projector 1 related to the present embodiment, since the illumination device 100 using the light source device 100A described above is provided, the projector 1 can form a high-intensity image.

Second Embodiment

Next, an illumination device according to a second embodiment of the invention will be described. The present embodiment differs from the first embodiment in the point that a rotary wheel type is used as the wavelength conversion device in the light source device. In the following description, the details of the same configurations and the same members as those of the first embodiment will be omitted or simplified.

Figure 5:
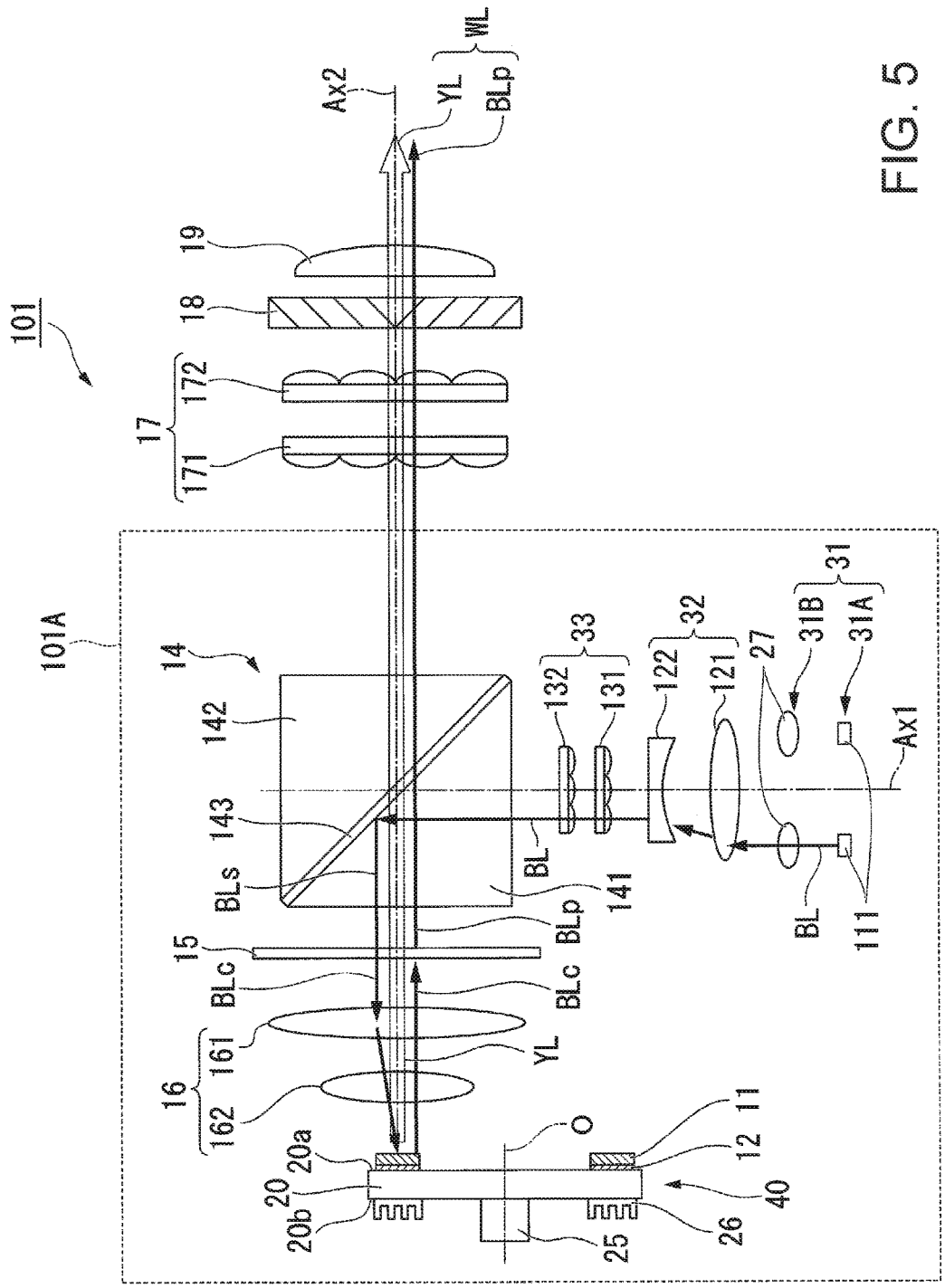
FIG. 5 is a diagram showing an outline of an illumination device according to a second embodiment.

FIG. 5 is a schematic view showing a configuration of the illumination device 101 of the present embodiment.

As shown in FIG. 5, the illumination device 101 is provided with a light source device 101A, the integrator optical system 17, the polarization conversion element 18, and the overlapping lens 19. The light source device 101A is provided with the light source section 31, the afocal optical system 32, the homogenizer optical system 33, the polarization separation device 14, the wave plate 15, the pickup optical system 16, and a wavelength conversion device 40.

Wavelength Conversion Device

As shown in FIG. 5, the wavelength conversion device 40 according to the present embodiment is provided with a base member 20, the phosphor layer 11, the reflecting layer 12, a rotary device 25, and the heat radiation member 26, wherein the reflecting layer 12 is disposed between the phosphor layer 11 and the base member 20, and the rotary device 25 rotates the base member 20.

In the present embodiment, the base member 20 is formed of, for example, a disk-like member, and the phosphor layer 11 is disposed on a first surface 20a of the base member 20 so as to have a ring-like shape. The heat radiation member 26 is disposed on a second surface 20b on the opposite side to the phosphor layer 11 in the base member 20 so as to have a ring-like shape.

The rotary device 25 rotates the base member 20 around the rotational axis O. As the rotary device 25, an electric motor, for example, can be used.

In the wavelength conversion device 40 of the present embodiment, since the reflecting layer 12 is also formed (see FIG. 3) throughout the entire area of the bottom surface 11B of the phosphor layer 11, the extraction efficiency of the fluorescence YL can be improved.

Further, by rotating the base member 20, the incident position of the excitation light to the phosphor layer 11 can be changed with time. Thus, it is possible to efficiently radiate the heat generated in the phosphor layer 11 due to the incidence of the excitation light compared to the configuration in which the excitation light enters concentrically in a predetermined area of the phosphor layer 11. Therefore, it is possible to reduce damages of the phosphor layer 11 due to the heat.

According to the wavelength conversion device 40 of the present embodiment, by improving the heat radiation performance of the phosphor layer 11, the rise in temperature of the phosphor layer 11 can be reduced, and thus, it is possible to reduce the deterioration of the luminous efficiency of the phosphor layer 11. Therefore, according to the light source device 101A equipped with the wavelength conversion device 40, it is possible to reduce the loss of the fluorescence YL with respect to the intensity of the incident excitation light. Further, according to the projector equipped with the illumination device 101 using the light source device 101A, it is possible to form a high-intensity image.

It should be noted that the invention is not limited to the contents of the embodiments described above, but can arbitrarily be modified within the scope or the spirit of the invention.

Further, although in the embodiments described above, there is described the example of installing the light source device according to the invention in the projector, the invention is not limited to this example. The light source device according to the invention can also be applied to lighting equipment, a headlight of a vehicle, and so on.

The entire disclosure of Japanese Patent Application No. 2017-024105, filed on Feb. 13, 2017 is expressly incorporated by reference herein.

What is claimed is:

1. A wavelength conversion device comprising:
a wavelength conversion layer, that is a phosphor layer, having a plurality of pores, and excited by light in a first wavelength band to thereby generate light in a second wavelength band different from the first wavelength band;
a transparent member adapted to fill in a recessed section occurring on a surface of the wavelength conversion layer due to the pore;
a reflecting member formed on the surface of the wavelength conversion layer and a surface of the transparent member; and
a base member disposed on an opposite side to the wavelength conversion layer of the reflecting member.

2. The wavelength conversion device according to claim 1, further comprising:
a rotary device adapted to rotate the base member around a rotational axis.

3. The wavelength conversion device according to claim 1, further comprising:
a heat radiation member disposed on a surface on an opposite side to the wavelength conversion layer in the base member.

4. A light source device comprising:
the wavelength conversion device according to claim 1; and
a light source adapted to emit the light in the first wavelength band toward the wavelength conversion layer.

5. A light source device comprising:
the wavelength conversion device according to claim 2; and
a light source adapted to emit the light in the first wavelength band toward the wavelength conversion layer.

6. A light source device comprising:
the wavelength conversion device according to claim 3; and
a light source adapted to emit the light in the first wavelength band toward the wavelength conversion layer.

7. A projector comprising:
the light source device according to claim 4;
a light modulation device adapted to modulate light from the light source device in accordance with image information to thereby form image light; and
a projection optical system adapted to project the image light.

8. A projector comprising:
the light source device according to claim 5;
a light modulation device adapted to modulate light from the light source device in accordance with image information to thereby form image light; and
a projection optical system adapted to project the image light.

9. A projector comprising:
the light source device according to claim 6;
a light modulation device adapted to modulate light from the light source device in accordance with image information to thereby form image light; and
a projection optical system adapted to project the image light.

10. A wavelength conversion device comprising:
a wavelength conversion layer having a plurality of pores, and excited by light in a first wavelength band to thereby generate light in a second wavelength band different from the first wavelength band;
a transparent member adapted to fill in a recessed section occurring on a surface of the wavelength conversion layer due to the pore;
a reflecting member formed on the surface of the wavelength conversion layer and a surface of the transparent member; and
a base member disposed on an opposite side to the wavelength conversion layer of the reflecting member,
wherein the pores have an average diameter of 60 μm.

11. The wavelength conversion device according to claim 10, further comprising:
a rotary device adapted to rotate the base member around a rotational axis.

12. The wavelength conversion device according to claim 10, further comprising:
a heat radiation member disposed on a surface on an opposite side to the wavelength conversion layer in the base member.

13. A light source device comprising:
the wavelength conversion device according to claim 10; and
a light source adapted to emit the light in the first wavelength band toward the wavelength conversion layer.

14. A light source device comprising:
the wavelength conversion device according to claim 11; and
a light source adapted to emit the light in the first wavelength band toward the wavelength conversion layer.

15. A light source device comprising:
the wavelength conversion device according to claim 12; and
a light source adapted to emit the light in the first wavelength band toward the wavelength conversion layer.

16. A projector comprising:
the light source device according to claim 13;
a light modulation device adapted to modulate light from the light source device in accordance with image information to thereby form image light; and
a projection optical system adapted to project the image light.

17. A projector comprising:
the light source device according to claim 14;
a light modulation device adapted to modulate light from the light source device in accordance with image information to thereby form image light; and
a projection optical system adapted to project the image light.

18. A projector comprising:
the light source device according to claim 15;
a light modulation device adapted to modulate light from the light source device in accordance with image information to thereby form image light; and
a projection optical system adapted to project the image light.

* * * * *